(12) United States Patent
Blocksome et al.

(10) Patent No.: US 8,655,962 B2
(45) Date of Patent: Feb. 18, 2014

(54) SHARED ADDRESS COLLECTIVES USING COUNTER MECHANISMS

(75) Inventors: Michael Blocksome, Rochester, MN (US); Gabor Dozsa, Yorktown Heights, NY (US); Thomas M. Gooding, Rochester, MN (US); Philip Heidelberger, Yorktown Heights, NY (US); Sameer Kumar, Yorktown Heights, NY (US); Amith R. Mamidala, Yorktown Heights, NY (US); Douglas Miller, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 12/568,115

(22) Filed: Sep. 28, 2009

(65) Prior Publication Data
US 2011/0078249 A1 Mar. 31, 2011

(51) Int. Cl.
*G06F 15/16* (2006.01)
*G06F 15/167* (2006.01)

(52) U.S. Cl.
USPC ............ 709/206; 709/205; 709/207; 709/216

(58) Field of Classification Search
USPC .................................. 709/205–207, 212–216
See application file for complete search history.

(56) References Cited

U.S. PATENT DOCUMENTS

| | | | | |
|---|---|---|---|---|
| 6,292,822 B1 * | 9/2001 | Hardwick | ...................... | 718/105 |
| 6,438,659 B1 * | 8/2002 | Bauman et al. | ............... | 711/141 |
| 6,751,619 B1 * | 6/2004 | Rowstron et al. | ............. | 709/203 |
| 6,967,920 B2 * | 11/2005 | Seidl et al. | ..................... | 370/230 |
| 7,120,117 B1 * | 10/2006 | Liu et al. | ........................ | 370/236 |
| 7,437,521 B1 * | 10/2008 | Scott et al. | ..................... | 711/151 |
| 7,949,815 B2 * | 5/2011 | Supalov et al. | ............... | 710/305 |
| 2003/0016670 A1 * | 1/2003 | Seidl et al. | ..................... | 370/392 |
| 2008/0127214 A1 * | 5/2008 | Holt | .............................. | 719/315 |
| 2009/0064176 A1 * | 3/2009 | Ohly et al. | ..................... | 719/313 |
| 2011/0191550 A1 * | 8/2011 | Lee et al. | ...................... | 711/154 |

* cited by examiner

*Primary Examiner* — Minh-Chau Nguyen
(74) *Attorney, Agent, or Firm* — Scully, Scott, Murphy & Presser, P.C.; Daniel P. Morris, Esq.

(57) ABSTRACT

A shared address space on a compute node stores data received from a network and data to transmit to the network. The shared address space includes an application buffer that can be directly operated upon by a plurality of processes, for instance, running on different cores on the compute node. A shared counter is used for one or more of signaling arrival of the data across the plurality of processes running on the compute node, signaling completion of an operation performed by one or more of the plurality of processes, obtaining reservation slots by one or more of the plurality of processes, or combinations thereof.

25 Claims, 5 Drawing Sheets

SHARED ADDRESS COLLECTIVES USING COUNTER MECHANISMS

STATEMENT REGARDING FEDERALLY SPONSORED RESEARCH OR DEVELOPMENT

This invention was made with Government support under Contract No.: B554331 awarded by Department of Energy. The Government has certain rights in this invention.

BACKGROUND

The present application relates to the optimization of collective communication in message passing interface (MPI) applications with multiple processes running on a compute node, in which for example, all the compute nodes may be connected by a fast interconnection network.

Large message collectives such as MPI_Broadcast (MPI_Beast) and MPI_Allreduce in an application running more than one process/node over an interconnection network, for example massive supercomputers, use an intermediate shared buffer for these operations. The drawbacks for using intermediate shared buffers may be additional copy costs and complexity of managing the intermediate buffers. For example, in MPI_Beast, the root of the operation first copies the data into a shared memory segment. The network and other processes local to the root node read the data from this shared memory segment. The data is received into a shared memory buffer at all the destination nodes followed by the processes reading the data from their respective local buffers. This incurs copy-overheads at the sending and receiving nodes. Also, the size of the buffer employed may be less than the application buffer. To avoid buffer overruns, additional mechanisms may be needed to effectively control the injection flow.

Obtaining good throughput, for example, for medium to large message sizes entails effective pipelining between different phases of the operation such as network and shared memory, shared memory and shared memory. Most of the current techniques use explicit synchronization in the form of flags, locks to verify whether data has been read or written. Apart from the overheads, it is difficult to achieve fine grain pipelining with these techniques. Moreover, on torus networks such as IBM™ Blue Gene™, data arrives from more than one link leading to a collective comprising of multiple streams of data flowing in/out of a given node.

BRIEF SUMMARY

A device and method for communication in message passing interface applications are provided. The device, in one aspect, may include a shared address space on a compute node. The shared address space is operable to store data received from a network and data to be sent out to the network. The shared address space includes an application buffer that can be directly operated upon by a plurality of processes. The device may also include a shared counter operable to be used for one or more of, signaling arrival of the data across the plurality of processes running on the compute node, signaling completion of an operation performed by one or more of the plurality of processes, obtaining reservation slots by one or more of the plurality of processes, or combinations thereof.

A collective communication method for message passing interface applications, in one aspect, may include receiving data from a global network for performing a collective operation, and writing the data directly into an application buffer of a core on a compute node receiving the data, the application buffer being in shared address space. The method may also include signaling using a shared counter of the received data, and in response to the signaling, copying the data directly from the application buffer to a plurality of cores on the compute node different from the core receiving the data.

Further features as well as the structure and operation of various embodiments are described in detail below with reference to the accompanying drawings. In the drawings, like reference numbers indicate identical or functionally similar elements.

DETAILED DESCRIPTION

The present disclosure in one aspect addresses performing, for example, medium to large message collectives such as MPI_Broadcast (MPI_Beast) and MPI_Allreduce in an application running more than one process or node over an interconnection network. These collective operations are extensively used across different MPI applications. Each compute node, for example, may have many cores. A design of these operations, in one embodiment, uses shared memory for communication operations inside the node. Efficient network primitives across the nodes may be also utilized.

In one embodiment of the present disclosure, shared address space mechanism together with shared counters may be used in performing the message collectives. Shared address in this disclosure refers to the mechanisms by which a process can directly access the memory of the peer process residing on the same node. This may involve directly or indirectly the operating system services on the node. The collective operation may be performed directly using the application buffers thereby avoiding the additional copy costs and complexity of managing the intermediate buffers. The present disclosure, in one aspect, uses the concept of shared counters for performing different roles during the operation. For instance, the shared counters may be used for a) signaling arrival of the data across different pipeline stages; b) signaling completion of the operation; and c) obtaining unique reservation slots. The counters used in a) for signaling arrival of the data across different pipeline stages may be written by a single process, read by many. The counters used in b) for signaling completion of the operation, and c) for obtaining unique reservation slots may be concurrently read or written. Hence, the shared counters may be updated atomically. Mechanisms for a) signaling arrival of the data across different pipeline stages and b) signaling completion of the operation may be used for collectives with data flowing in order. Mechanisms for c) obtaining unique reservation slots may be used to design a Broadcast FiFo (first-in-first-out) which may be used for transporting either the data or the meta-data information. This mechanism may be used when the data may flow out of order.

The Shared address mechanisms of the present disclosure allow for easy means of core specialization where certain tasks can be delegated exclusively to one or more cores in a node. This is useful, for example, in MPI_Allreduce, where the tasks include local sum, local broadcast. For IBM™'s Blue Gene/P™ (BGP) Collective network, the tasks include injection and reception of the data in and/or out of the network.

Figure 1:
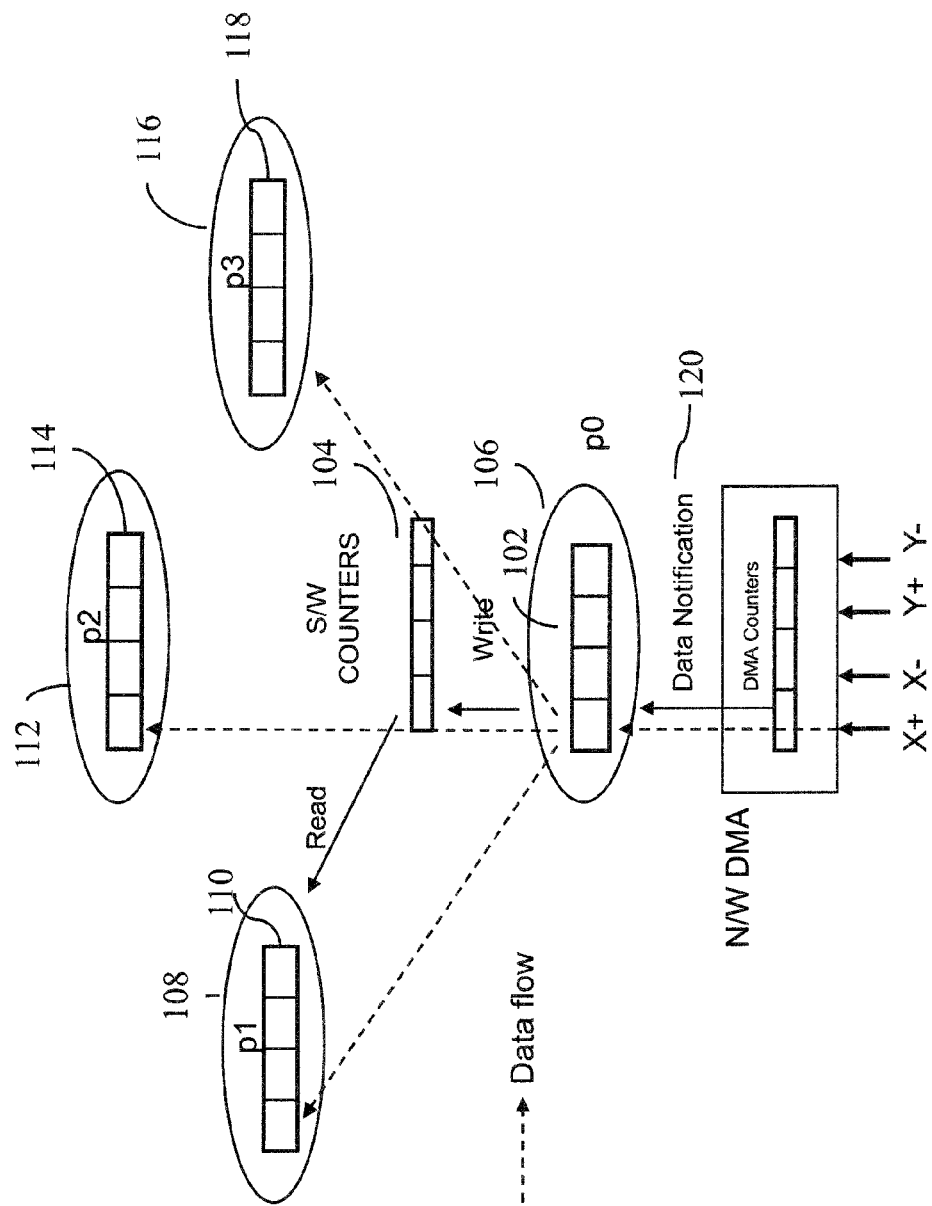
FIG. 1 illustrates an example of the broadcast operation using the shared counters together with shared address space concept in one embodiment of the present disclosure.

The mechanism of shared address space and shared counters in one embodiment of the present disclosure may be used to construct the broadcast collective. FIG. 1 illustrates an example of the broadcast operation using the shared counters together with shared address space concept in one embodiment of the present disclosure. The figure illustrates an example with data arriving via four streams of data, though only one stream of data is shown in simplicity of explanation herein. In this example, the data arrives in-order in all the streams.

Shared Address Space Mechanism

In this mechanism in one embodiment, the operating system supports sharing of the address space of a process to other local processes on a node. This support may be enabled by specialized system calls, which lets a given process (e.g., 108, 112, 116) map the memory region 102 of a particular process 106, for example, by specifying the starting and ending boundary addresses of the memory region. The memory region is addressed by the virtual address returned by this mapping routine. The operating system makes an entry in the virtual to physical translation table to point to the address space of the other process when any reference is made to the mapped virtual address space. Examples of system calls may be the System Memory Map calls that enable a process to view the memory of the other process.

Shared Counter Mechanism

This mechanism in one embodiment uses a counter 104 visible to all the processes local to a node. For example, the counter 104 may be in the shared memory of the local processes or cores. Briefly, in shared memory approaches, the processes use a separate shared memory segment which is mutually shared across all the processes. In shared address approaches described above, there is no separate shared segment; processes are directly able to access the peer processes' memory via specialized system calls as described above.

The counter 104 in one embodiment may include the following fields: a) base address of the data buffer, b) max size of the buffer, c) total bytes written into the buffer so far, d) rank of master process updating the counter, e) total number of processes accessing the counter, f) atomic completion counter and g) status of the counter.

A master process herein is referred to as a process that initially receives data that also needs to be sent to other processes. The master process (e.g., 106) initializes the counter 104 with the base address of the data buffer 102. The data buffer 102 resides on the master 106 and data 120 arrives in order into this buffer 102. Data arrives "in order" via the network or by another process writing into it, if the buffer is shared. Initially, the buffer contents are empty and the master process sets the total bytes written to it as zero. Once the master process is notified about the reception of a chunk of bytes in the data stream, it increments the total bytes by the same amount. The master also initializes the total number of processes accessing the data buffer.

The other processes (e.g., 108, 112, 116) poll the counter value (e.g., a value in 104) and test whether it has been incremented. All these processes also maintain, locally, a byte count which is used to compare against the counter value at the master. Once they observe an increment in the counter, it is an indication of new data arriving into the data buffer of the master. After processing the arrived chunk of bytes from the master, the processes increment their own local byte counts. Once this byte count equals the max size of the buffer, the processes indicate the processing of the data in the buffer by incrementing an atomic completion counter.

Broadcast of data using Shared Address Space and Shared Counters

As an example, in a 3-D Torus communication network connecting all the compute nodes such as in IBM™'s Blue Gene/P™ (BGP) massively parallel supercomputer, there can be six different links entering and leaving a given node. The collective algorithms on such network keep all the links busy to extract maximum performance. This is accomplished by assigning unique connection identifiers to each of the links and scheduling the data movement on each connection. For a broadcast operation, data can potentially arrive via six different connections into a single node. With multiple cores on a node, we propose a new mechanism of extending this connection inside a node. Using this mechanism multiple processes can copy data arriving on a connection for the broadcast operation. For instance, multiple cores on a node can copy data arriving on a connection for the broadcast operation. In this way, data may be pipelined efficiently between the network and memory within the node.

In this mechanism, the broadcast data is received from the network in one of the processes' data buffer (e.g., 102). We designate this process (e.g., 106) as the master process. The master (e.g., 106) after receiving the network data 120 notifies other processes (e.g., 108, 112, 116) about the received data. In the technique of the present disclosure in one embodiment, unlike the known methods, the data buffers used in the process are application buffers and the data is copied out directly from these buffers. This is possible by using the Shared Address mechanism described above, which enables a process to view the memory of the other process. In the present example, this would be the master process (e.g., 106) exposing its memory region (e.g., 102) to all the other processes (e.g., 108, 112, 116) on the node. The master process (e.g., 106) synchronizes with the other processes (e.g., 108, 112, 116) using the Shared Counter mechanism described above. The arrival of the data in a connection is signaled by the counter 104 designated for that connection. In one embodiment, for example, there are separate counters for each connection. In the example considered in FIG. 1, the processes (e.g., 108, 112, 116) on the node poll the counters (e.g., 104) for each connection. On a 3-D Torus, like the BGP, there can be six such connections at one single time corresponding to the six different routes of reaching the node. In one embodiment the contents of the DMA counters may be mirrored into the shared counter variables. The completion counter is used after the data has been copied out entirely from the master process, for instance, to each process's memory region (e.g., 110, 114, 118). All the processes, except the master, increment this counter after copying the data. Once this counter reaches (n−1), where n is the total number of processes, the master can re-use the buffer.

In one embodiment, a counter may be dedicated for a given broadcast and whenever the data arrives in the buffer, it is incremented by the total number of bytes received in the buffer.

Figure 2A:
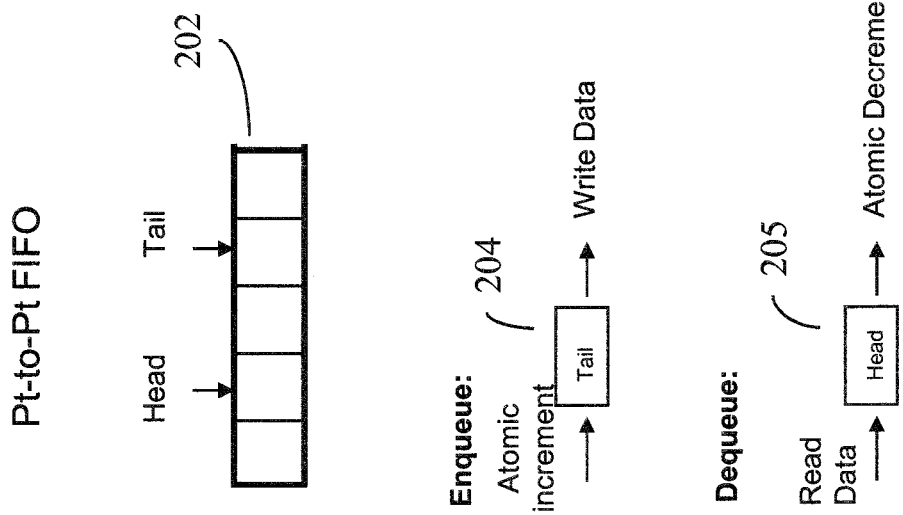
FIGS. 2A and 2B illustrate examples of the point-to-point FIFO and broadcast FIFO operation using atomic operations in one embodiment of the present disclosure.
Figure 2B:
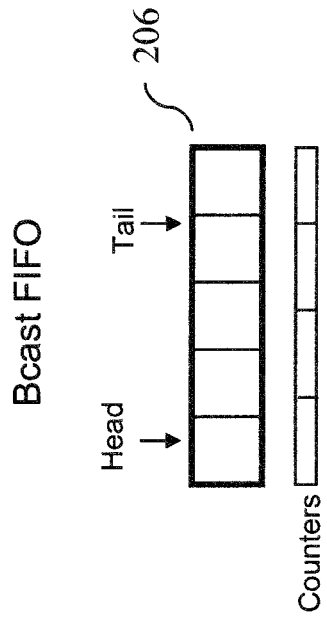
Figure 2B:
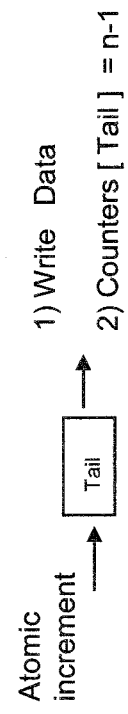
Figure 2B:
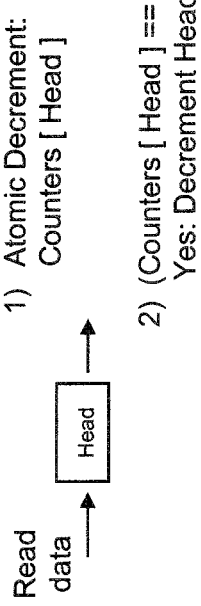

FIGS. 2A and 2B illustrate examples of the point-to-point FIFO and broadcast FIFO operation using atomic operations in one embodiment of the present disclosure. We first explain the basic mechanism of using atomic counters to construct a simple point-to-point FIFO with reference to FIG. 2A. We then demonstrate the broadcast FIFO operation with reference to FIG. 2B.

Point-to-Point FIFO (Pt-to-Pt FIFO)

In this mechanism, a process reserves a contiguous chunk of shared memory to receive incoming messages from all the local processes. The memory may be structured in the form of a shared FIFO 202 where a first arriving process reserves a slot in the FIFO followed by the next process and so on. The FIFO includes the following attributes in one embodiment:

a) Each process enqueues into a unique slot reserved by it. No two processes obtain the same slot in the FIFO 202.

b) Messages are drained in the same order as they were enqueued in. The order of enqueueing is determined by the order of the reservations of the slots.

Enqueueing and Dequeueing the FIFO

There are multiple ways in which a unique slot can be reserved by a process. One of the ways may be to use a mutex for the FIFO and obtain a unique slot. For example, each FIFO would have a counter associated with it. A process may increment this counter to obtain a unique slot identifier(id). A mutex would guarantee that accesses to this shared variable are serialized. Lock and unlock for every enqueue operation may be utilized. In another aspect, atomic operations may be used for designing lock-free queues. The atomic operations approach may be to use a fetch and increment operation which simplifies the handling of the different queue elements. As shown in the FIG. 2, enqueuing a data element is accomplished by atomically incrementing the tail 204 of the FIFO and reserving a unique slot. The atomicity of the counter ensures that no two processes write to the same location in the FIFO. The dequeue operation is handled in a similar fashion by decrementing the value of the counter. In one embodiment, the FIFO may be wrapped. For example, the Head 205 pointer may be reset back to its original position only after it reaches the end.

Broadcast FIFO (Bcast FIFO):

Referring to FIG. 2B, Broadcast FIFO 206 follows the mechanism similar to the Pt-to-Pt FIFO 202 for enqueueing the message. A given process increments an atomic counter for reserving a unique slot in the FIFO 206. The FIFO 206 differs in the way the message is dequeued. Except for the process inserting a message into the FIFO 206, all the others read the message in order for it to be dequeued from the FIFO 206. To accomplish this, a separate atomic counter 208 is associated with the reading of each FIFO element. After the process reads the message it decrements this counter 208. After the value reaches zero, the last arriving process dequeues the message from the FIFO. As shown in the FIG. 2B, a separate array of counters 208 is associated with the FIFO 206. All the elements in this counter array 208 are initialized to a value of n−1 where n is the total number of processes.

Figure 3:
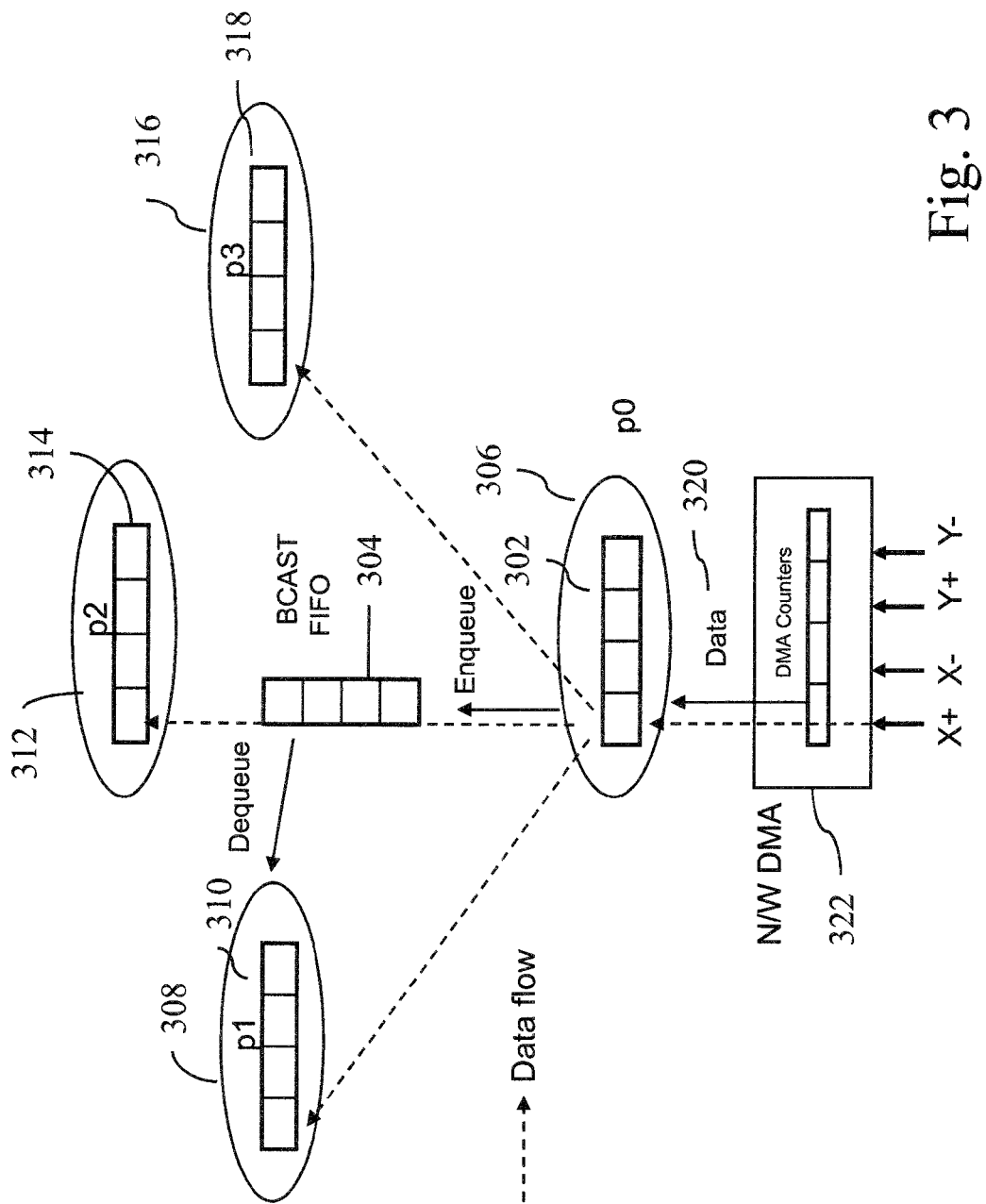
FIG. 3 shows an example of the broadcast operation using the broadcast FIFO in one embodiment of the present disclosure.

FIG. 3 shows an example of the broadcast operation using the broadcast FIFO in one embodiment of the present disclosure. In this example, the data may arrive out-of-order from the different streams. This mechanism is similar to the one described with reference to FIG. 1. This mechanism, however, can be used for data arriving out-of-order in a data stream. Instead of using message counters, the master process 406 notifies the arrival of the data 320 using the Bcast FIFO 304.

The mechanism works as follows in one embodiment: A chunk of data is received from a network 322, e.g., the Torus network, into the application buffer 302, the master process 306 enqueues a data element into the Bcast FIFO 304. This data element contains the meta-data information describing the buffer 302. It contains the starting address of the data together with the bytes received for that chunk. The meta-data information also contains the connection identifier of the global broadcast flow. The other processes (e.g., 308, 312, 316) polling on the FIFO 304 read this information and directly copy the data from the master's application buffer 302 into their respective buffers (e.g., 310, 314, 318). In another embodiment, the data in the buffer 302 may be copied to the FIFO 304 as well. In one embodiment, the movement of the head and tail pointer may be automatically tracked in the Broadcast FIFO implementation using fetch and increment atomic operations.

The data can arrive via, for example, any of the six directions for a 3-D torus. The same FIFO 304 is used to multiplex data from all the connections. Since, the data element describes the information of every chunk received, there is no need of a separate Bcast FIFO for each connection. The FIFO implements a concurrent data structure, for example, to atomically manage the buffers and the associated data synchronization, which aid the programmability and scalability of the collective operations. Bcast FIFOs may be in shared memory accessible by the processes or cores in the compute node.

In one aspect, the techniques of the present disclosure also may be applied in the Collective network, for instance, for broadcast over tree, which for example may be used with small and medium message broadcast. We first explain the current algorithms followed by the new algorithms of the present disclosure.

In the current approaches, the current algorithms use the fast hardware allreduce feature (math units) of the collective network. The root node injects data while other nodes inject zeros in a global OR operation. In Symmetric Multi-Processing (SMP) mode, two cores within a node are needed to fully saturate the collective network throughput. Hence, two threads (the main application MPI thread and a helper communication thread) inject and receive the broadcast packets on the collective network. In QUAD mode, the DMA moves the data among the cores of each node. This can occur using the memory FIFOs and direct put DMA schemes.

BGP has a very efficient mechanism of broadcast using the tree hardware. For instance, in shared memory broadcast over collective network, the data from the tree is transferred into a buffer shared across all the nodes. The same core accessing the collective network does both the injection and reception of the data. The received data is placed in a shared memory segment from where it is copied over by the other processes on the node. This optimization works for short messages where the copy cost is not a dominating factor in the performance of the collective operation.

Shared address broadcast over collective network in the present disclosure cuts down the copy costs boosting the performance. Also, another benefit of this capability is that it allows easy means for the cores to specialize in certain tasks to extract the maximum possible performance from the underlying hardware. The techniques of the present disclosure as described herein, may efficiently leverage this tree by attending to load balancing across the different tasks. Effectively utilizing the tree may need two independent tasks injecting and receiving data into and from the collective network respectively. Similar to using two threads to access collective network, a similar approach can be applied with two MPI processes. An injection process injects data into the collective network and a separate reception process copies the network output into the application buffer. However, distributing the data across all the processes in a node poses a problem. Directly using the Shared Memory techniques creates a scenario where either the injection or the reception process or both are loaded more than the other two processes as described below.

Assume that the reception process receives data into a shared memory segment. This data can be copied over by the two idle cores. However, both the injection and the reception process have to simultaneously copy the data into their own application buffers as well. This may slow down the injection and reception rate, degrading the performance. Similar scenario occurs where the reception process receives data directly into its own buffer. Since, there is excess of memory bandwidth relative to the tree, the two idle cores can be delegated tasks in the collective operation. We demonstrate the utility of Shared Address mechanism to solve this problem.

Consider a system of N MPI processes where on each node, four MPI processes are launched with local ranks of zero to three. Assume that the broadcast operation is initiated by the global root whose local rank corresponds to 0. We designate all the processes with local rank zero from all the nodes as the injection processes. All the processes with local rank one would be the reception processes. The data buffers involved in the operation are directly the application buffers. For example, the global root injects from its application buffers. All the local rank one processes receive the data directly into their final buffers. Once a chunk of data is copied into its application buffer, it notifies the other two processes with local ranks two and three. It uses a software shared counter mechanism described above. These two processes copy the data directly from the application buffer of process with local rank one. Further, the process with local rank two makes an additional copy into the application buffer of the injection process, which has the local rank of zero. The extra copy is not a problem as the memory bandwidth is at least twice that of the collective network.

Allreduce MPI operation using shared address space and shared counter mechanism is now explained. The shared address space mechanism together with shared counter mechanism described above can be used to optimize large message Allreduce. In an allreduce operation, each process has two data buffers, the send buffer and the receive buffer. The send buffer contains the data for the reduction. The receive buffer contains the final reduced data. The new mechanisms in one embodiment of this disclosure work by exposing the send and receive buffers of all the participating process using the shared address space technique described above. We propose a core specialization strategy to effectively use the network and memory resources to boost the performance of allreduce operation for large messages.

The current approach pipelines the reduction and broadcast phases of the allreduce. A ring algorithm is used in the reduction followed by the broadcast of the reduced data from the assigned root process. Similar to the broadcast algorithm, a multicolor scheme is used to select three edge-disjoint routes in the 3-D torus both for reduction and broadcast. In this scheme, redundant copies of data may be transferred by the DMA for the reduction operation. Also, the DMA may not be able to keep pace with both the inter-node and intra-nod data transfers.

Shared address messaging of the present disclosure may overcome this issue by delegating specialized tasks to different cores. For instance, in one embodiment of the present disclosure, the allreduce operation can be decomposed into the following tasks: a) Network allreduce, b) local reduce, and c) local broadcast. The data is first locally reduced followed by a global network reduction. The reduced data after arriving into the node is broadcasted locally. In one aspect, one core may be delegated to do the network allreduce operation and the remaining three cores to do the local reduce and broadcast operation. Since there are three independent allreduce operations or three colors occurring at the same time, each of the three cores is delegated to handle one color each. The data buffers are uniformly split three way and each of the cores works on its partition. This mechanism in one embodiment is described below.

Assume that the pipeline unit used for reduction and broadcast used is Pwidth bytes. As soon as the operation starts, each of the core starts summing up the first Pwidth bytes from each of the four processes application buffers. All the application buffers are mapped using the system call interfaces, and no extra copy operations are necessary. The cores then inform the master core doing the network allreduce protocol via shared software message counters. The network protocol is exactly identical to its Symmetric Multi-Processing (SMP) counterpart where there is only one process per node. Once the network data arrives in the application receive buffer of the master core, it notifies the three cores. The other three cores start copying the data into their own respective buffers after they are done with reducing all the buffer partitions assigned to them.

Figure 4:
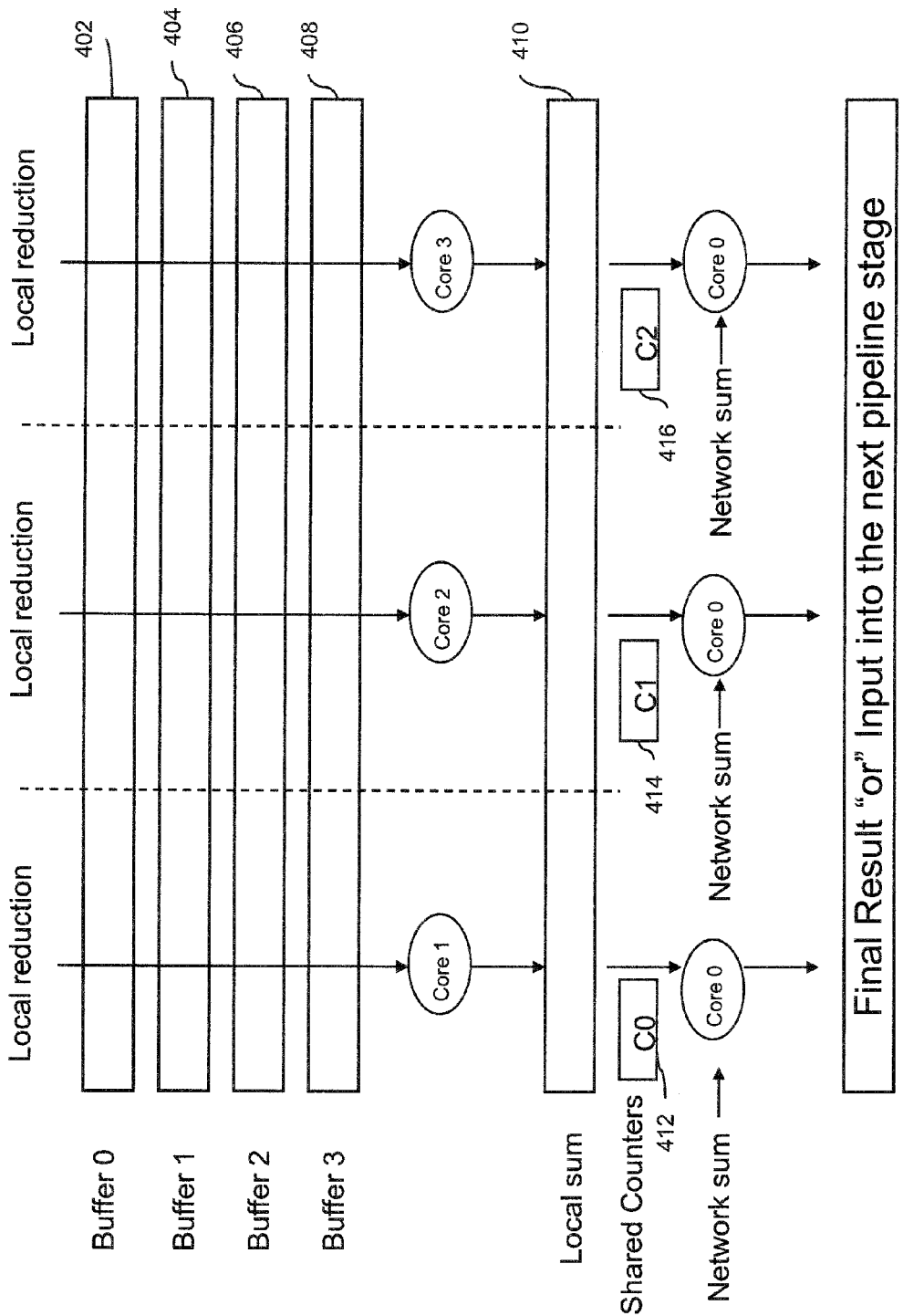
FIG. 4 illustrates architecture of shared address space and shared counter used in allreduce operation in one embodiment of the present disclosure.

In one embodiment of the present disclosure, the core delegation is used with a tabular method. Each process reduces a set of columns of data instead of reducing the entire data range of the send buffer. For example, the reduction of a set of columns of data can be delegated to one particular core as shown in FIG. 4. Another core can be delegated to work on network protocol processing for the allreduce operation. In FIG. 4, cores 1, 2, 3 do reduction of the data and the core 0 does the reduction of the network and local sums. The Buffers 0, 1, 2, 3 (402, 404, 406, 408) belong to the source application buffers of cores 0, 1, 2, 3 respectively. Using the shared address approach, the data in these buffers can be accessed immediately without any extra copying of data involved, for instance, resulting in improved the performance. The Local Sum buffer 410 contains the contribution from each core. This buffer is the application buffer of core 0 and no extra temporary staging buffers are used to store the data thereby eliminating any copy. The cores communicate with each other using the shared counter mechanism described above. Since the data is in place in the application buffers, the only information necessary to describe the buffers are the starting address of the buffers and the offsets from these starting address. The shared counter mechanism is used to communicate the offsets of the data location once the task is done. The starting address is communicated once before the operation begins. In the example shown in FIG. 4, cores 1, 2, 3, use the counters C0, C1, C2 (412, 414, 416) to communicate to the core 0 once the reduction is complete.

One mechanism of using the shared address space in allreduce feature (math units) in another embodiment may arrange all the participating processes in a ring fashion. Data chunks move around the ring and are reduced at a particular process with the data contributed by that process. Inside the node, the data movement occurs via memory operations. Using the shared counter mechanism, a peer notifies the arrival of the data chunk. The consumer of the data chunk then reduces the newly arrived data chunk with its share of data. It then notifies its peer and so on. Once a chunk of data is reduced by all the processes, it is broadcasted by using the mechanism described above.

The techniques illustrated and described above may be implemented in a massively parallel supercomputer such as IBM™'s Blue Gene/P (BGP) supercomputer. BGP includes thousands of compute nodes interconnected by the primary network, 3-D Torus transporting data across the nodes. There is also the tree network which supports hardware accelerated collective operations. Each of the nodes is made up of four embedded cores, arranged as an Symmetric Multi-Processing (SMP).

More specifically, BGP comprises of three different interconnection networks: 3-D Tours, Collective and Global interrupt network connecting all the compute nodes. The 3-D Torus is used as the primary network to exchange point-to-point and collective message data. Memory FIFOs provides a mechanism to inject the data descriptors to the DMA for sending the data and also receiving the data once it arrives at the destination. The message ordering is preserved if the same route is used for all the data packets for a given source and destination pair of nodes. On BGP this would be the case if deterministic routing is used in transferring the packets.

The 3-D torus is dead-lock free and supports reliable packet delivery. Each node in the torus connects to six neighbors with links of raw throughput. It also provides for hardware accelerated broadcast where in a deposit-bit can be set in the packet header allowing torus packets to be copied at intermediate nodes along the way to the destination (on torus line). This feature is used in the collective algorithms over BGP.

BGP collective network has a tree topology and supports reliable data movement at a raw throughput. The hardware is capable of routing packets upward to the root or downward to the leaves, and it has an integer arithmetic logic unit (ALU). This makes it very efficient for broadcast and reduction operations. Packet injection and reception on the collective network is handled by processor core hardware synchronization.

A DMA engine that is responsible for injecting and receiving packets on the torus network and for local intra-node memory copies. The high performance DMA engine can also keep all six links busy, resulting in better performance of torus point-to-point and collective communication.

The DMA engine allows the capabilities of direct put and get operations of message data to and from a destination buffer. In this Direct Put/Get mechanism, the host posts a descriptor to the DMA with the description of the source and destination buffers. Counters are also allocated to track the progress of the operation. For example, for every chunk of data read or written, a counter would be appropriately incremented or decremented by the number of bytes transferred in the chunk. The BGP supports hardware atomic operations via the lockbox mechanism and using lwarx/stwcx memory instructions. The lockbox mechanism uses hardware counters and is faster than using the lwarx/stwcx memory instructions. The host kernel on BGP allows for a process to expose its memory to another process via specific system calls for system memory map. Using this mechanism a process can directly read the data from the source buffers of other process during the message transfer operations.

The primary mode of running applications over BGP is via the standard Message Passing Interface (MPI). It is possible in these applications for messages to be exchanged both inside and across the nodes, especially when all the cores are used for MPI tasks. The methods or techniques disclosed herein may be used for intra-node communication. In the methods proposed in the present disclosure, the cores move the data, for instance, in performing intra-node data communication, as compared to a separate DMA engine transferring data in one embodiment.

MPI provides a wide variety of communication primitives. In particular, it provides for a rich set of collective operations which are extensively used in many scientific applications.

The techniques of the present disclosure allow collective operations such as Broadcast and Allreduce to share data via the cache coherent memory subsystem. The processes can either use a separate mutually shared segment or directly access the memory of the peer process. In addition, as described above, a concurrent broadcast fifo for MPI_Broadcast may be effected using atomic operations to enable safe enqueue and dequeue of data items. For example, the fifo may be designed on any platform supporting the fetch and increment atomic operation. Shared address capability may not only overcome the copy bottleneck but also allow for easy means of cores to specialize in certain tasks. These tasks such as injection, copy and others can be performed in a pipelined and asynchronous manner wherever possible utilizing the resources in an efficient manner as described previously.

Some of the benefits of using shared address methods in the present disclosure may include the following:

Avoid extraneous copy costs thereby pushing the performance envelope of the collective algorithms.
  Allow lightweight synchronization structures such as counters to effectively pipeline across the different stages of the collective: between network and shared memory and across different stages in the shared memory.
  Avoid explicit global flow control across network and intra-node interfaces. Since the destination and source buffers are the application buffers, data is chanelled directly in and out of these buffers. Avoiding staging buffers automatically solves the issue of explicit flow control. However, care must be taken to pin the buffers in the memory during the operation. In BGP, by default all the application memory is always pinned in the memory.
  Allow means of core specialization where certain tasks can be delegated to one or more cores increasing the performance of the collective algorithms.
  in the case of allreduce operation, the cores are specialized to simultaneously do a local sum and broadcast the data arriving from the network. A dedicated core may perform allreduce protocol processing over Torus network.

A performance study was conducted on BGP hardware on two racks equaling a total of approximately 8192 processes. The study results indicates that the software message counters integrate very well with the network communication methods providing more than two fold increase in raw throughput. It provides for an effective method of tracking pipelined chunks of data received into the buffer. The techniques described in the present disclosure are observed to have lower overhead. Within a node, the software FIFO described herein decreases the latency by about 44.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A device for communication in message passing interface applications with multiple processes running on a compute node connected to a global network of compute nodes, comprising:

a shared address space on a compute node, operable to store data coming in from a network and data to be written out to the network, wherein the shared address space includes an application buffer that can be directly operated upon by a plurality of processes; and a shared counter operable to be used for performing different roles during a message collective operation of a message passing interface, the different roles comprising signaling arrival of the data across the plurality of processes running on the compute node, signaling completion of an operation performed by one or more of the plurality of processes, obtaining reservation slots by one or more of the plurality of processes, wherein the shared counter is shared by and visible to the plurality of processes, wherein the shared counter functions as completion counter during a broadcast operation wherein a process of the plurality of processes designated as a master process receives broadcast data from the global network into a buffer associated with the master process and notifies other of the plurality of processes of the received data, wherein each of the other of the plurality of processes increments the completion counter after copying the received data to a memory region associated with said each of the other of the plurality of processes, and in response to the completion counter reaching a total number of the other of the plurality of processes, the master process reuses the buffer.

2. The device of claim 1, wherein the shared counter is operable for signaling arrival of the data across the plurality of processes running on the compute node and signaling completion of an operation.

3. The device of claim 2, wherein a process running on the compute node in response to receiving data from the network writes to the shared address space and increments a byte count in the shared counter, and wherein one or more other processes running on the compute node poll the shared counter and in response to detecting an increment in the byte count copy the data.

4. The device of claim 3, wherein the one or more other processes running on the compute node signal completion of copy operation in the shared counter.

5. The device of claim 1, wherein the shared counter includes FIFO data structure, wherein one or more of the plurality of processes obtain a reservation slot in the FIFO.

6. The device of claim 5, wherein the shared counter further includes an atomic counter for indicating whether one or more of the plurality of processes read the FIFO, wherein broadcast operations may be performed between one of the plurality of processes and rest of the plurality of processes using the FIFO and the atomic counter.

7. The device of claim 1, wherein each of the plurality of processes run on a separate core on the compute node.

8. The device of claim 1, wherein the shared address space includes send and receive buffers used for allreduce MPI operation.

9. The device of claim 1, wherein injection and reception of the data to and from a global network is handled exclusively by two separate dedicated cores, and local broadcast is handled by using another two cores to copy the data from an application buffer of a core dedicated to receiving the data from the global network, the application buffer being in the shared address space, and wherein the shared counter is used to synchronized the data.

10. The device of claim 1, where in the device include one counter for each connection to a global network.

11. The device of claim 1, wherein the shared address space and the shared counter are used to pipeline across different stages of operations performed by the plurality of processes.

12. A collective communication method for message passing interface applications with multiple processes running on a compute node, comprising:

receiving data from a global network for performing a collective operation;

writing the data directly into an application buffer of a core on a compute node receiving the data, the application buffer being in shared address space;

signaling using a shared counter of the received data; and in response to the signaling, copying the data directly from the application buffer to a plurality of cores on the compute node different from the core receiving the data, wherein the shared counter is shared by and visible to the plurality of processes, wherein the shared counter functions as completion counter during a broadcast operation wherein a process of the plurality of processes designated as a master process receives broadcast data from the global network and notifies other of the plurality of processes of the received data, wherein each of the other of the plurality of processes increments the completion counter after copying the received data to a memory region associated with said each of the other of the plurality of processes, and in response to the completion counter reaching a total number of the other of the plurality of processes, the master process reuses the application buffer.

13. The method of claim 12, wherein the shared counter includes at least information associated with base address of the application buffer and total bytes written into the application buffer.

14. The method of claim 13, wherein the signaling using the shared counter includes incrementing the shared counter.

15. The method of claim 14, wherein an element in the FIFO data structure is reserved for one of the plurality of processes running on the compute node using an atomic counter.

16. The method of claim 13, wherein the shared counter further includes an atomic completion counter.

17. The method of claim 12, further including:

dedicating each core on the compute node to a different task.

18. The method of claim 17, wherein injection and reception of the data to and from a global network is handled exclusively by two separate dedicated cores, and local broadcast is handled by using another two cores to copy the data from an application buffer of a core dedicated to receiving the data from the global network, the application buffer being in the shared address space, and wherein the shared counter is used to synchronized the data.

19. The method of claim 17, wherein an allreduce MPI operation is performed by the compute node by having one core in the compute node perform local sum and network reduction and rest of the cores on the compute node perform local data reduction, wherein the shared address space is used for data access and the shared counter is used for synchronization among the one core and the rest of the cores.

20. The method of claim 12, wherein the shared counter includes a FIFO data structure.

21. A computer readable storage medium storing a program of instructions executable by a machine to perform a collective communication method for message passing interface applications with multiple processes running on a compute node, comprising:

receiving data from a global network for performing a collective operation;

writing the data directly into an application buffer of a core on a compute node receiving the data, the application buffer being in shared address space;

signaling using a shared counter of the received data; and in response to the signaling, copying the data directly from the application buffer to a plurality of cores on the compute node different from the core receiving the data, wherein the shared counter is shared by and visible to the plurality of processes, wherein the shared counter functions as completion counter during a broadcast operation wherein a process of the plurality of processes designated as a master process receives broadcast data from the global network and notifies other of the plurality of processes of the received data, wherein each of the other of the plurality of processes increments the completion counter after copying the received data to a memory region associated with said each of the other of the plurality of processes, and in response to the completion counter reaching a total number of the other of the plurality of processes, the master process reuses the application buffer.

22. The computer readable storage medium of claim 21, wherein the shared counter includes at least information associated with base address of the application buffer and total bytes written into the application buffer.

23. The computer readable storage medium of claim 22, wherein the signaling using the shared counter includes incrementing the shared counter.

24. The computer readable storage medium of claim 21, wherein the shared counter includes a FIFO data structure.

25. The computer readable storage medium of claim 21, injection and reception of the data to and from a global network is handled exclusively by two separate dedicated cores, and local broadcast is handled by using another two cores to copy the data from an application buffer of a core dedicated to receiving the data from the global network, the application buffer being in the shared address space, and wherein the shared counter is used to synchronized the data.

* * * * *